United States Patent [19]
Dunn et al.

[11] Patent Number: 5,995,599
[45] Date of Patent: Nov. 30, 1999

[54] COUPLER FOR AN ACOUSTIC COUPLED COMMUNICATIONS DEVICE

[75] Inventors: William Dunn, Palo Alto; Scott F. Fullam, Mountain View, both of Calif.

[73] Assignee: PocketScience, Inc., Santa Clara, Calif.

[21] Appl. No.: 09/203,300

[22] Filed: Dec. 1, 1998

Related U.S. Application Data

[60] Provisional application No. 60/095,732, Aug. 7, 1998.

[51] Int. Cl.$^6$ .................................................. H04M 11/00
[52] U.S. Cl. ........................................ 379/93.37; 379/444
[58] Field of Search .................................... 379/93.37, 52, 379/110.01, 442–444

[56] References Cited

U.S. PATENT DOCUMENTS

| | | |
|---|---|---|
| H1290 | 2/1994 | Mann et al. |
| D. 261,761 | 11/1981 | Ingber et al. |
| D. 265,992 | 8/1982 | Hirata et al. |
| D. 270,834 | 10/1983 | Genaro et al. |
| D. 272,345 | 1/1984 | Kessler et al. |
| D. 273,111 | 3/1984 | Hirata et al. |
| D. 279,184 | 6/1985 | Sakamoto . |
| D. 299,457 | 1/1989 | Behnk . |
| D. 324,378 | 3/1992 | Poupore . |
| D. 341,594 | 11/1993 | Kawai et al. |
| 3,934,100 | 1/1976 | Harada . |
| 3,992,583 | 11/1976 | Davis et al. |
| 4,016,530 | 4/1977 | Goll . |
| 4,042,793 | 8/1977 | Bellenger . |
| 4,068,095 | 1/1978 | Ghormley et al. .......... 379/93.37 |
| 4,100,373 | 7/1978 | Perkins . |
| 4,119,941 | 10/1978 | Moore et al. |
| 4,149,033 | 4/1979 | Costello et al. |
| 4,162,373 | 7/1979 | Ingber . |
| 4,252,996 | 2/1981 | D'Agostino . |
| 4,288,661 | 9/1981 | Krishan . |
| 4,297,530 | 10/1981 | Kessler ................................... 379/444 |
| 4,297,538 | 10/1981 | Massa . |
| 4,314,099 | 2/1982 | Jeffries et al. |
| 4,341,926 | 7/1982 | Chester . |
| 4,442,318 | 4/1984 | Desrochers ......................... 379/93.37 |
| 4,446,333 | 5/1984 | Kessler . |
| 4,476,348 | 10/1984 | Wasserman et al. |
| 4,599,491 | 7/1986 | Serrano . |
| 4,720,858 | 1/1988 | Pavelka et al. |
| 4,901,345 | 2/1990 | Imagawa . |
| 4,905,186 | 2/1990 | Fukui . |
| 5,063,590 | 11/1991 | Koshiishi . |
| 5,134,649 | 7/1992 | Gutzmer . |

FOREIGN PATENT DOCUMENTS

| | | | |
|---|---|---|---|
| 57-93758 | 6/1982 | Japan ..................................... 379/444 |
| 2180721 | 4/1987 | United Kingdom ................... 379/444 |

*Primary Examiner*—Wing F. Chan
*Attorney, Agent, or Firm*—Gray Cary Ware & Freidenrich LLP

[57] ABSTRACT

A coupler is provided which may be incorporated into a handheld communications device to permit the handheld device to be acoustically coupled to a variety of telephone handsets. The device may include a spring-biased, adjustable microphone arm onto which a microphone is mounted in order to acoustically couple the microphone to the telephone handset. The microphone arm may be adjustable to adapt to a variety of telephone handset styles, such as cellular telephones or cordless telephones, in order to permit the acoustical coupling to be achieved with a large number of different telephone handsets.

21 Claims, 17 Drawing Sheets

COUPLER FOR AN ACOUSTIC COUPLED COMMUNICATIONS DEVICE

This application claims benefit of provisional application Ser. No. 60/095,732 filed Aug. 7, 1998.

BACKGROUND OF THE INVENTION

This invention relates generally to an acoustically coupled communications device and in particular to a coupler for acoustically coupling a microphone and a speaker of the communications device to a telephone handset.

In order for a device, having a speaker and microphone, to acoustically communicate data and information through a telephone handset over a telephone line, it is necessary to acoustically couple the mouthpiece and earpiece of the telephone handset to a speaker and a microphone, respectively, of the communications device. A good acoustic coupling of the device to the telephone handset provides reliable transmission and reception of the data and information signals.

Conventional acoustical modems are acoustically coupled to the telephone handset in order to transmit data over the telephone system. These acoustical modems often used large cups which enclosed the entire mouthpiece and the entire earpiece of the telephone handset in order to acoustically couple the speaker and microphone of the acoustical modem to the telephone handset. These conventional acoustical modem couplers are generally quite large and unwieldy. In addition, these acoustical modem couplers are not designed to work with a small handheld device and could not be effectively incorporated into a small handheld device. In addition, these conventional acoustical modem couplers are primarily designed to be connected to a typical standard telephone handset, such as those used for pay telephones, and could not be easily adjusted to work with other types of telephone handsets, such as cellular telephones or cordless phones. There are some conventional acoustical couplers which provide some degree of adjustability of the large plastic cups, but even these adjustable acoustical couplers can not accommodate modem cellular telephones or cordless telephones due to the odd shape and positioning of the mouthpiece and earpiece of the telephone. For example, a typical cellular phone may have a flip portion with a mouthpiece integrated into the flip portion and an earpiece which is integrated into a body portion of the telephone which can not be effectively coupled to using the conventional acoustical couplers.

Another type of conventional acoustical modem coupler utilized a securing strap which wrapped around the telephone handset in order to tightly secure the mouthpiece and earpiece of the telephone handset to a microphone and speaker of the acoustical modem. To install such a modem onto the telephone handset, however, the user must attempt to align the speaker and microphone of the acoustical modem with the earpiece and mouthpiece, respectively, of the telephone handset and then attach the strap around the telephone handset without disturbing the alignment. This installation process is slow and it is difficult to achieve a good coupling. In addition, because this acoustical coupler is still large and heavy, this acoustical coupler is not intended for use with a small handheld device. As above, this conventional acoustical coupler also suffered from a lack of adjustment capability to adjust to different types of telephone handsets.

Therefore, it is desirable to provide a coupler which is incorporated within a handheld communications device and permits the communications device to be acoustical coupled to a wide variety of different telephone handsets including conventional telephones, cellular telephones and cordless telephones. The coupler also overcomes the above problems with conventional acoustical couplers.

SUMMARY OF THE INVENTION

The invention provides a coupler which may be incorporated into a handheld communications device and permits the handheld device to be acoustically coupled to a variety of different telephone handsets. To accomplish the acoustical coupling, the device may include a means for moving the microphone and/or speaker of the communications device into a variety of different positions to acoustically couple to different telephone handsets having different configurations. In one embodiment, the device may include a spring-biased member onto which the microphone is mounted into order to press the microphone against the earpiece of the telephone handset in order to acoustically couple the microphone to the telephone handset. The size of the microphone member desirable needs to be as small as possible so that it is not cumbersome to operate and so that it does not unduly increase the overall size of the small handheld communications device. The microphone member may be a mechanical arm which may be adjusted to different lengths in order to adjust to a variety of telephone handset styles, such as cellular telephones or cordless telephones, which permits the acoustical coupling to be achieved with a large number of different telephone handsets. The coupler also ensures that a tight acoustic seal between the microphone and the earpiece of the telephone handset is achieved. This helps to assure a flat frequency response from the microphone and to eliminate or reduce external noise which may disrupt or prevent the communications process. In accordance with the invention and due to the characteristics of the speaker of the device, the speaker does not require an acoustic seal surrounding it so that the speaker may be open coupled to the mouthpiece of the telephone handset unlike conventional acoustical modems which formed a seal around the speaker.

The acoustical coupler in accordance with the invention is preferably designed so that it may retract into the body of the handheld communications device. Therefore, the acoustical coupler does not increase the overall size of the device and protects the microphone and itself from damage, yet provides the necessary acoustical coupling between the microphone of the handheld device and the earpiece of the telephone handset. In accordance with one aspect of the invention, when the handheld device is held against the telephone handset, the microphone member transfers as much force as possible to the microphone in order to tightly press the microphone and its sealing cup against the earpiece of the telephone handset which creates a tight acoustic seal between the microphone and the earpiece of the telephone handset.

In accordance with another aspect of the invention, the speaker may be mounted on the handheld communications device so that the speaker, instead of the microphone, may move to adjust for different telephone handsets. In accordance with yet another aspect of the invention, the speaker and microphone may both be mounted on the handheld communications device so that both the speaker and the microphone may move to adjust for different telephone handsets. A variety of different embodiments of the microphone members are described each of which positions the microphone and/or the speaker properly and also presses the microphone against the earpiece of the telephone handset to achieve good acoustical coupling.

In accordance with the invention, a device for acoustically coupling a communication device having a microphone and a speaker to a mouthpiece and earpiece, respectively, of a telephone handset is provided. The coupler may include a speaker assembly that attaches to the communications device and a microphone assembly which also attaches to the communications device. The microphone assembly may include a microphone, a seal surrounding the microphone to reduce unwanted noise and means for biasing the microphone and seal against the earpiece of the telephone handset to establish an acoustical coupling between the microphone and the earpiece. The coupler may further include means for adjusting the position of the speaker assembly relative to the microphone assembly to position the microphone and speaker so that the microphone and speaker are positioned properly for a variety of different telephone handsets. In various embodiments of the coupler, the microphone assembly may move the position of the microphone relative to a fixed speaker, the speaker may be moved to change its position relative to a fixed microphone or both the microphone and speaker may be moved relative to each other. The microphone and speaker assemblies may have a variety of different embodiments.

DETAILED DESCRIPTION OF A PREFERRED EMBODIMENT

The invention is particularly applicable to an acoustic coupler for acoustically coupling a handheld communications device to a variety of telephone handsets and it is in this context that the invention will be described. It will be appreciated, however, that the coupler in accordance with the invention has greater utility, such as to other acoustically coupled communications systems. Prior to describing the coupler in accordance with the invention, an example of a handheld communications device which may include the coupler will be described.

Figure 1:
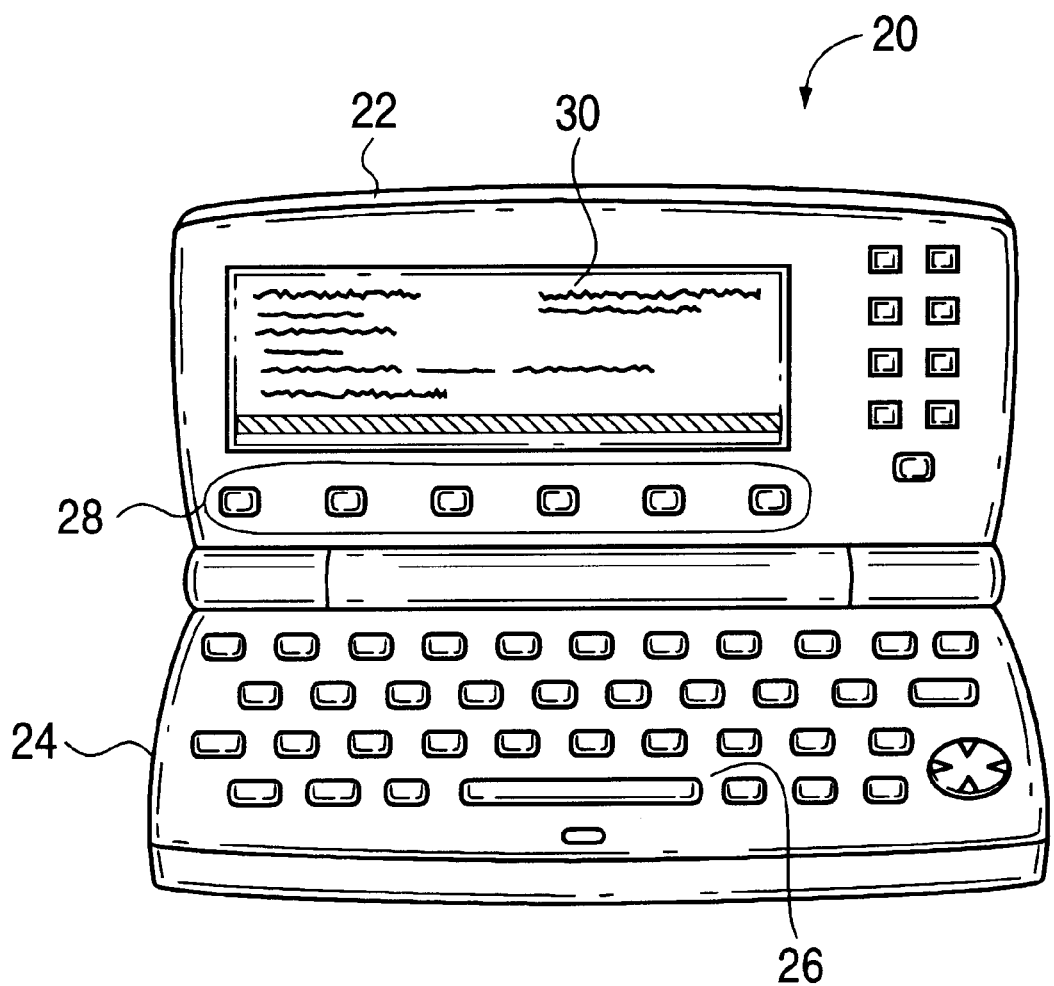
FIG. 1 is a perspective view illustrating an example of a handheld communications device which may incorporate an acoustic coupler in accordance with the invention.

FIG. 1 is a perspective view illustrating a handheld communications device 20 which may include a coupler in accordance with the invention. As shown, the handheld device 20 may comprise a housing having an upper shell 22 connected to an articulated lower shell 24. When the shells are separated, as shown in FIG. 1, a keyboard 26, various function buttons 28 and a display 30, such as liquid crystal display (LCD), are exposed. When the shells are closed, these components of the handheld communications device are protected from damage. The keyboard may permit a user to enter data into the handheld communications device while the display 20 may display various data. The device 20 may also have a microphone and a speaker (shown in FIG. 2) attached to bottom of the device. The microphone may receive acoustical tones from the earpiece of the telephone handset while the speaker may generate acoustical tones which are coupled to the mouthpiece of the telephone handset. Further details about the communication of the electronic messages may be found in pending U.S. application Ser. No. 08/588,165, filed Jan. 18, 1996 which is incorporated herein by reference.

To send an electronic message, the user enters a message (e-mail, facsimile, pager and the like) into the device using the keyboard, for example. Then, the user may dial a telephone number and connect to a central server. Once connected to the central server, the user may press the handheld device, and in particular the microphone and speaker of the device, against the earpiece and mouthpiece of the telephone handset in order to acoustically couple the device to the handset to transmit the message as a series of acoustical tones to a central server. In this manner, multiple messages may be transmitted by the device to the central server. The handheld communications device may also receive messages from the server through the telephone handset so that the messages may be shown on the display for the user to read. In order to ensure communication of the acoustical data, it is necessary to form a good acoustical coupling between the handheld communications device and the telephone handset. The coupler in accordance with the invention, as will be described below, ensures a good acoustical coupling of the mouthpiece and earpiece of the telephone handset with the speaker and microphone, respectively, of the handheld communications device. The handheld communications device shown, however, is only an example of a communications device which may use the coupler in accordance with the invention and therefore it should be noted that the coupler may be used with a variety of systems and devices which acoustically communicate data.

In accordance with one embodiment of the coupler, as described below with reference to FIGS. 2–6, a spring-biased microphone arm may be used to adjust the position of the microphone and press a sealing cup around the microphone against the earpiece of the telephone handset to accomplish the acoustical coupling. Several other embodiments in which the position of the microphone of the device may be adjusted will also be described. In another embodiment of the invention, the speaker of the handheld communications device may be mounted on the communications device so that the speaker may move instead of the microphone. In yet another embodiment of the invention, both the speaker and the microphone of the handheld communications device may be mounted on the communications device so that both the speaker and the microphone may move instead of only the microphone. In all of the embodiment of the invention which will now be described, there may be electrical connections to the speaker and microphone (not shown) to provide electrical power to the components and to communicate electrical signals between the device and the microphone and speaker. For example, in the first embodiment, a microphone wire may be attached to and hidden by the microphone arm.

For each embodiment of the coupler device described below, the speaker may be open coupled to the mouthpiece of the telephone handset (i.e., there is no acoustical seal around the speaker) due to the characteristics of the speaker. Thus, unlike conventional acoustical couplers which typically surround the mouthpiece of the telephone handset with an acoustical cup, the coupler device in accordance with the invention does not require the acoustical cup around the mouthpiece. To help accomplish this open coupling, the speaker of the device generates acoustical signals having an intensity level of between 90 to 100 dB so that a tight acoustical coupling (like the microphone) is not necessary. Now, a first embodiment of the coupler in accordance with the invention will be described.

Figure 2:
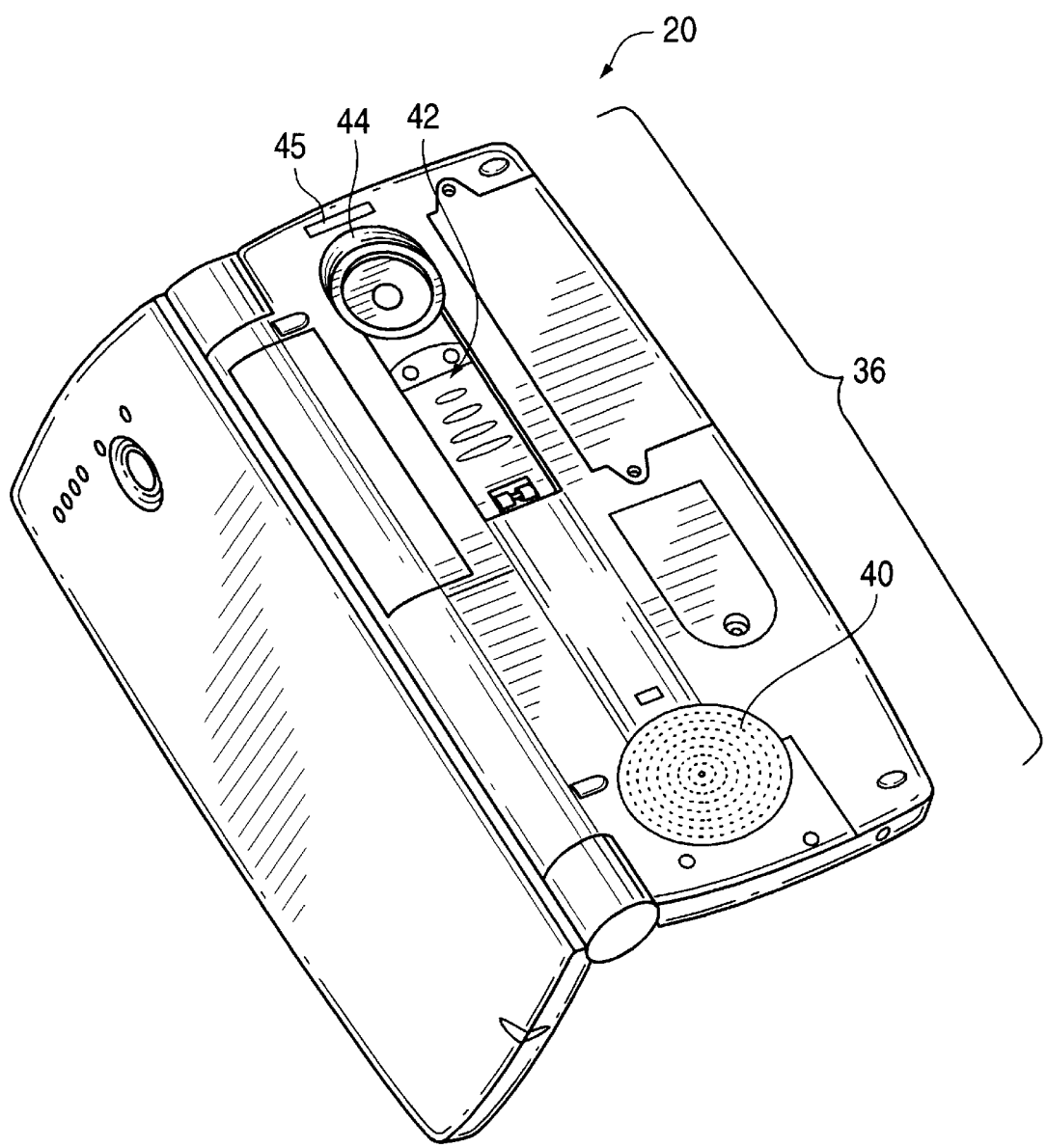
FIG. 2 is a perspective view of the bottom of the handheld communications device of FIG. 1 showing a speaker and a retracted microphone arm in accordance with one embodiment of the invention.

FIG. 2 is a perspective view of the bottom of the handheld communications device 20 of FIG. 1 which may include a coupler 36 in accordance with the invention. In particular, the bottom of the handheld communications device may have a speaker 40 and a microphone assembly 42 which together form the coupler in accordance with this embodiment of the invention. Thus, in accordance with the invention, the coupler couples both the microphone and speaker of the device 20 to the telephone handset as described below.

In FIG. 2, the microphone assembly 42, which may be a microphone arm, is shown in a retracted position and is housed within a recess 44 in the bottom of the handheld communications device so that the microphone arm 42 is protected from damage when the microphone arm 42 is in the retracted position. The structural details of the microphone arm 42 will be described below in more detail. The device 20 may also include a pad 45 so that, as the microphone arm 42 is extended, it rests partially on the pad which helps to bias the microphone arm away from the device. The pad 45 may be made of a rubber material so that the portion of the telephone handset resting on the pad does not slip off of the device while being held against the device. In order to perform a data communications session, the user of the device 20 may extend the microphone arm, as described below, until the microphone is properly aligned with the earpiece of the telephone handset. The user may then press the microphone and speaker of the device against the earpiece and mouthpiece, respectively, of the telephone handset to achieve a good acoustical coupling and begin the data communications session. Now, the details of the microphone arm 42 will be described.

Figure 3:
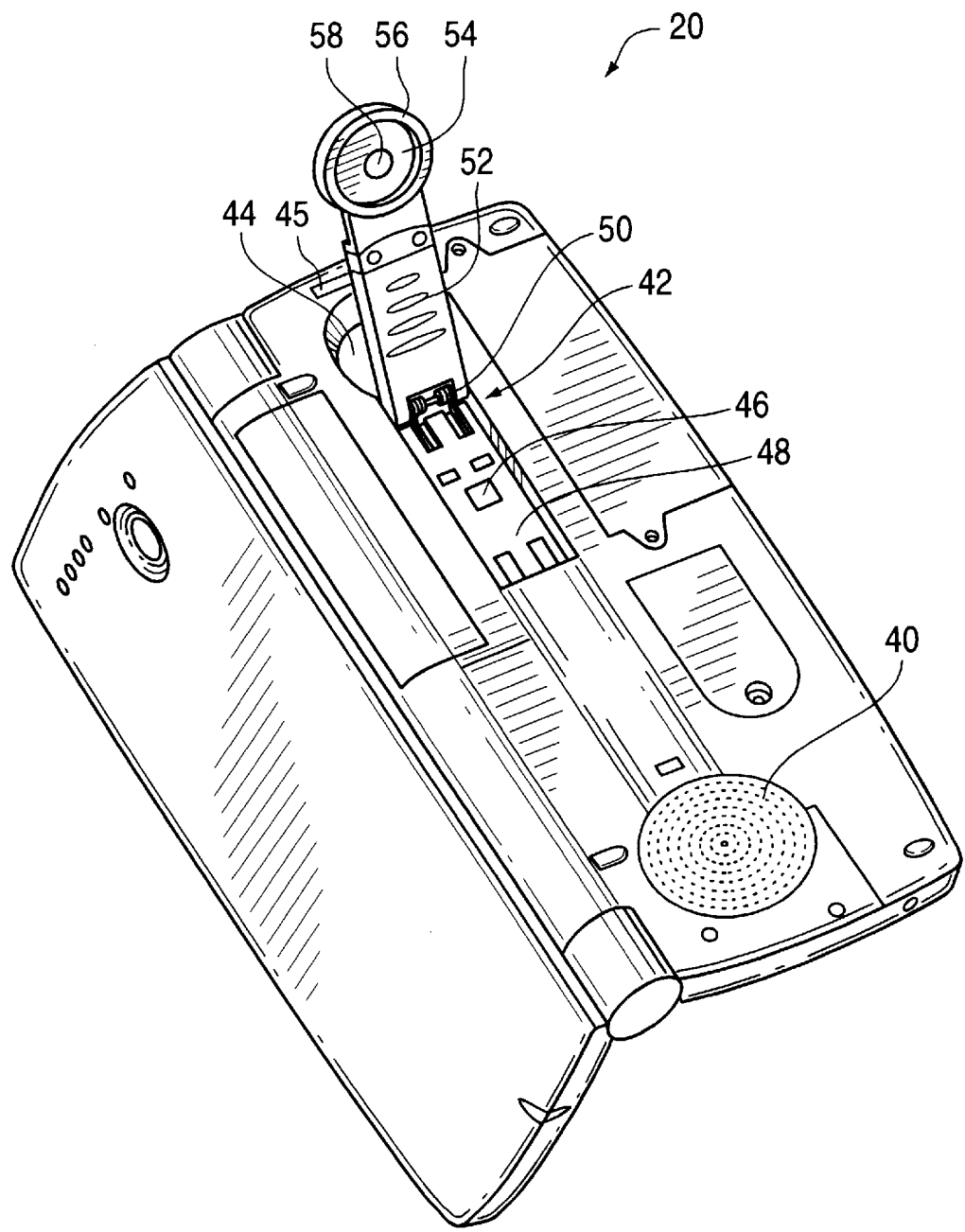
FIG. 3 is a perspective view of the bottom of the handheld communications device of FIG. 1 showing the microphone arm in an extended position.

FIG. 3 is a perspective view of the bottom of the handheld communications device 20 of FIG. 1 showing the coupler 36 in accordance with the invention and in particular the microphone arm 42 in an extended position. As shown, the microphone arm 42 has been extended out of the recess 44. The microphone arm 42 may include a base portion 46 which slides in a channel 48 in the device 20 to extend and/or retract the microphone arm 42 and the microphone support member 52 attached at one end to the base portion 46. The microphone arm 42 may further include a biasing member 50, such as a conventional spring, which interconnects the base portion 46 to a microphone support member 52 so that, when the microphone arm 42 has been extended, the microphone support member 52 is biased away from the device 20 as shown. Therefore, as a telephone handset is placed against the bottom of the device 20, the microphone support member 52 is pressed against the device 20 and against the spring force of the biasing member 50. Therefore, the force of the biasing member 50 helps to keep a microphone 58 and a sealing cup 56 tightly pressed against to the earpiece of the telephone handset. If the bias force of the biasing member is overcome, the microphone may rest against the protruding bump 45 at the edge of the device so that, as the user presses the telephone handset against the device, the microphone and sealing cup are pressed in between the telephone handset and the protruding bump which forms a good acoustical seal. In this example, the base portion and the microphone support member may both be rectangular shaped members, but the invention is not limited to any particular shape of the members.

The microphone support member 52 may also be attached to a microphone assembly 54. The microphone assembly 54 may include a microphone sealing cup 56 which surrounds a microphone 58. The sealing cup 56 may be made of a rubber material and may be preferably sufficiently large to surround the holes of an earpiece of the telephone handset in order to prevent outside noise from affecting the acoustical coupling between the microphone 58 and the earpiece of the telephone handset. The microphone assembly 54 may be rigidly attached to the microphone support member so that the spring force of the biasing member 50 is transferred to the microphone assembly and in particular to the sealing cup and the microphone. Now, the acoustical coupling of the microphone arm 42 and the microphone 58 to an earpiece of a telephone handset will be described.

Figure 4:
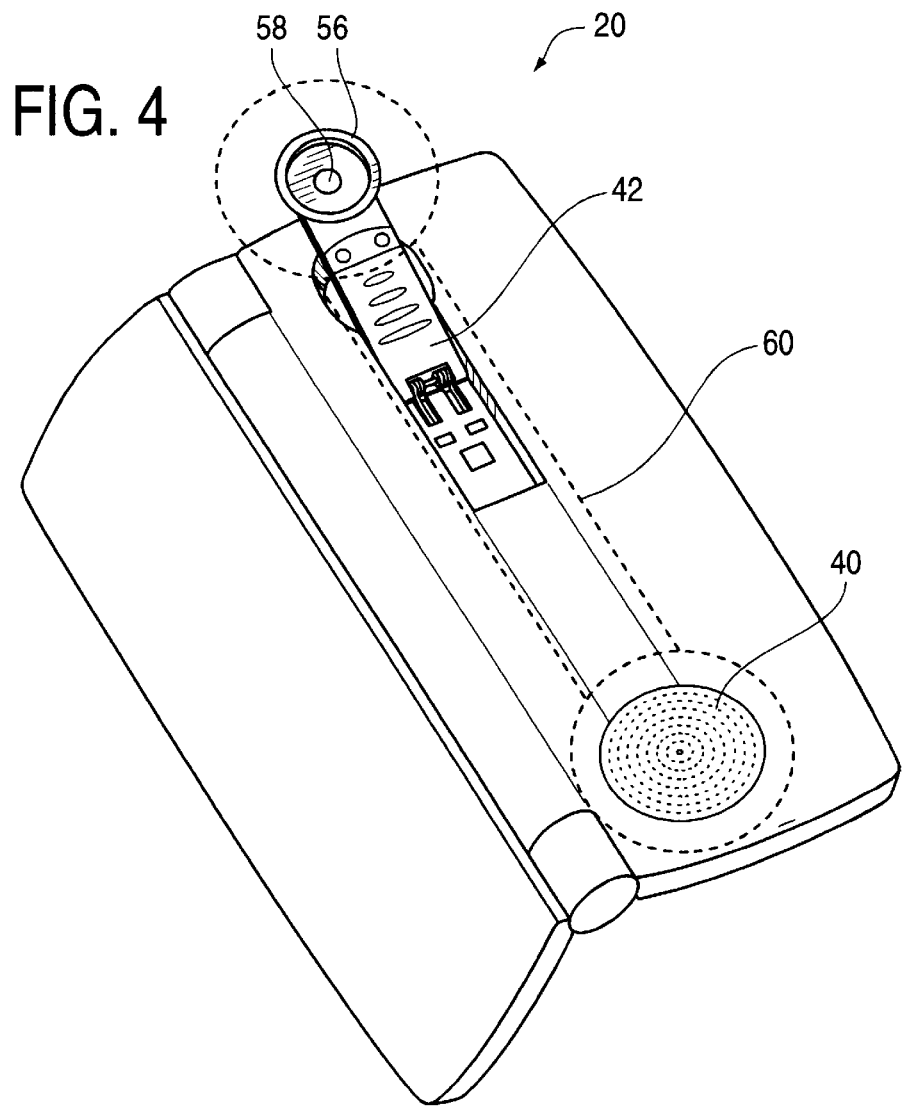
FIG. 4 is a perspective view of a telephone handset and the microphone arm acoustically coupled together in accordance with the invention.
Figure 5:
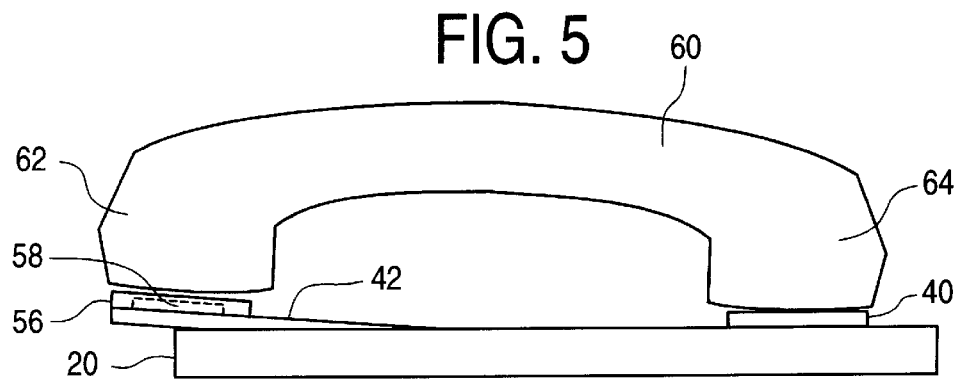
FIG. 5 is a side view of the coupled microphone arm and telephone handset of FIG. 4.

FIG. 4 is a perspective view of a telephone handset 60 (shown in dotted lines in FIG. 4) and the microphone 58 acoustically coupled together in accordance with the invention and FIG. 5 is a side view of the coupled microphone 58 and telephone handset 60 of FIG. 4. In these figures, a user of the handheld communications device has aligned an earpiece 62 and a mouthpiece 64 of the telephone handset 60 up to the microphone 58 and speaker 40, respectively, of the device 20 and pressed them together. It should be noted that the base portion 46, shown in FIG. 3, may slide in the channel 48 in order to adjust the distance of the microphone 58 from the speaker 40 in order to adjust for different telephone handsets. As shown in FIG. 5, when the telephone handset 60 is pressed against the device 20, the microphone arm 42, which is normally spring biased away from the device 20, generates a force as the telephone handset is pressed against the microphone arm 42 which will tend to press the sealing cup 56 against the earpiece 62 of the telephone handset 60 and establish a better acoustical seal so that the acoustical coupling between the microphone and the earpiece of the telephone handset may be established. The speaker of the device, however, does not usually need to be pressed against the telephone handset because the mouthpiece of the telephone handset is less sensitive to external noise. Now, more details about the microphone arm will be described.

Figure 6A:
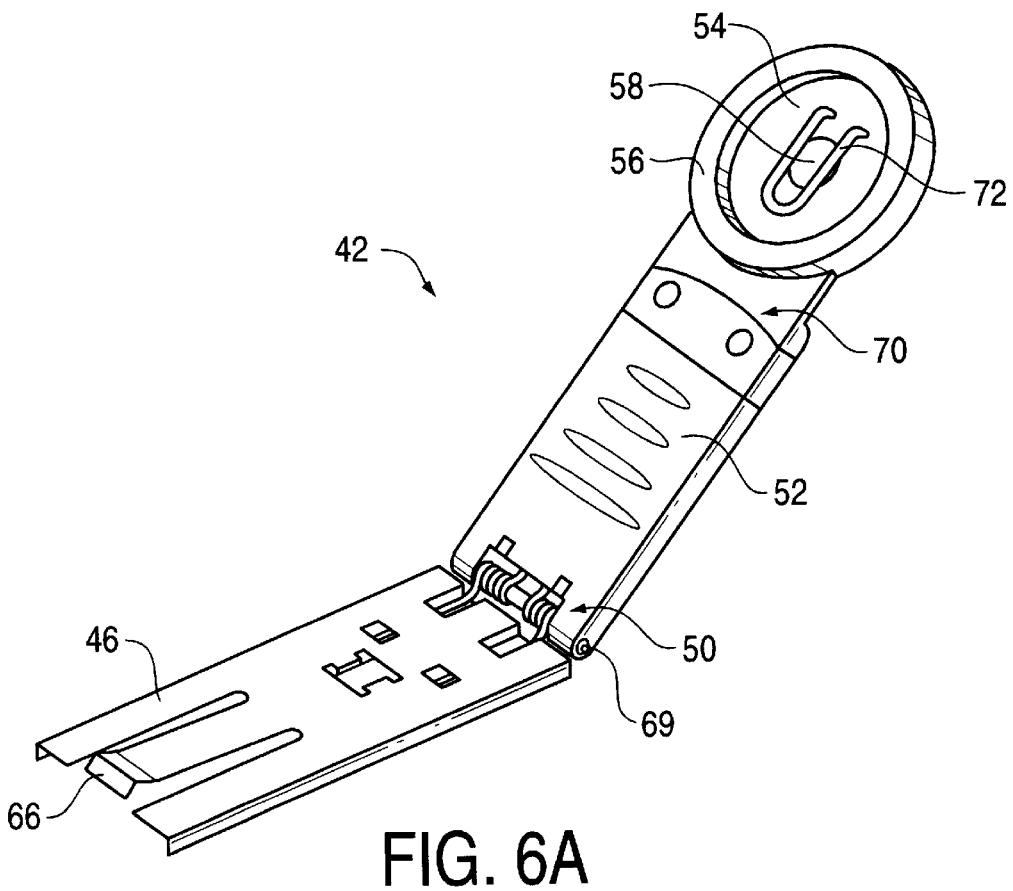
FIG. 6A is a perspective view illustrating the microphone arm in accordance with the invention.

FIG. 6A is a perspective view illustrating more details of the microphone arm 42 in accordance with one embodiment of the invention. The base portion 46 may be manufactured out of a lightweight metal, such as aluminum, or a hard plastic. The base portion may also include a detent 66 which interacts with teeth in the channel of the device (shown in FIG. 2) to extend the microphone arm to one or more different extended positions. The biasing member 50 may be one or more conventional coil springs which apply a biasing force to the microphone support member 52 such that the microphone support member 52, when in an extended position, is biased away from the device as described above. As shown, the base portion 46 and the microphone support member 52 may be rotatably connected to each other by an axle 69 and the biasing member 50 may be mounted on the axle. The microphone support member 52 may be manufactured out of a hard plastic or lightweight metal as well. The microphone assembly 54 may include an attachment surface 70, which rigidly attaches to the microphone support member 52 so that any force generated by the biasing member 50 may be transferred to the microphone assembly 54 to help hold the sealing cup against the telephone handset. The microphone assembly 54 may also include a microphone retention member 72 which keeps the microphone 58 within the microphone assembly 54.

In operation, as the user of the handheld communications device presses the telephone handset against the handheld communications device, the microphone arm, which is biased away from the device, is pressed back towards the device as the user holds the device and the telephone handset together. The pressure of holding the telephone handset and device together in combination with the biasing force of the biasing member causes the sealing cup and the microphone to be pressed against the telephone handset. Thus, the microphone arm is designed to provide a maximum amount of force directly behind the microphone and the sealing cup 56 so that the sealing cup surrounding the microphone acts as a seal over the holes in the earpiece of the telephone handset. In a preferred embodiment, the size of the sealing cup may be sufficient to cover all of the holes in the earpiece of the telephone handset so that extraneous noise does not corrupt the acoustical communications session. In combination, these pieces of the microphone arm help to promote flatness in the frequency response of a modem signal delivered from the microphone. Now, details about an example of a microphone arm latch mechanism will be described.

Figure 6B:
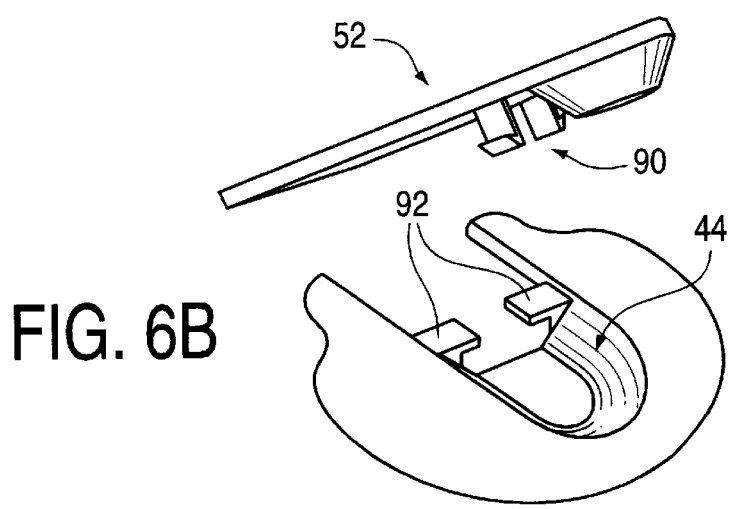
FIG. 6B is a diagram illustrating an example of the details of the microphone arm latching mechanism.

FIG. 6B illustrates an example of a microphone arm latching mechanism in accordance with the invention, although the invention may be used with a variety of other different latching mechanism. As shown, the device 20 may include the cavity 45 into which the microphone support member 52 may be placed. As shown, the underside of the microphone support member 52 may include a pair of hooks 90 which mate with a catch 92 in the cavity 45 in order to latch the microphone assembly into the device when the microphone is not being used. Now, a second embodiment of the coupler in accordance with the invention will be described.

Figure 7A:
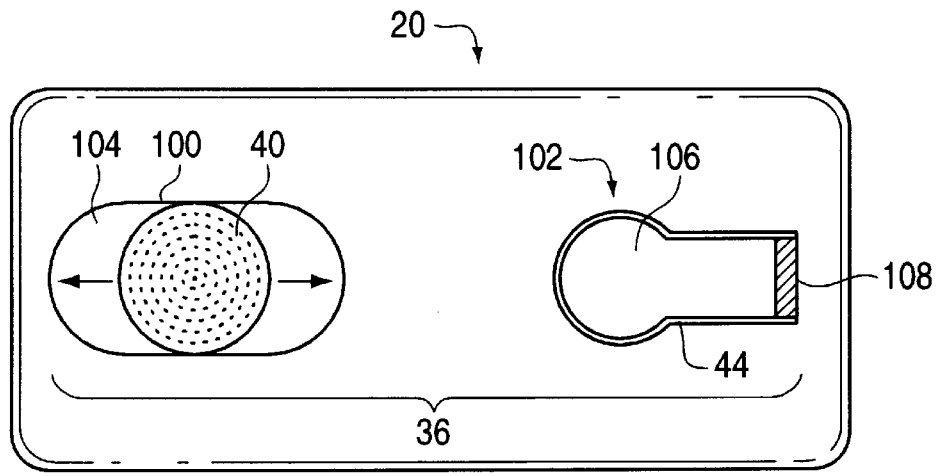
FIG. 7A is a diagram illustrating a second embodiment of the coupler in accordance with the invention in a closed position.
Figure 7B:
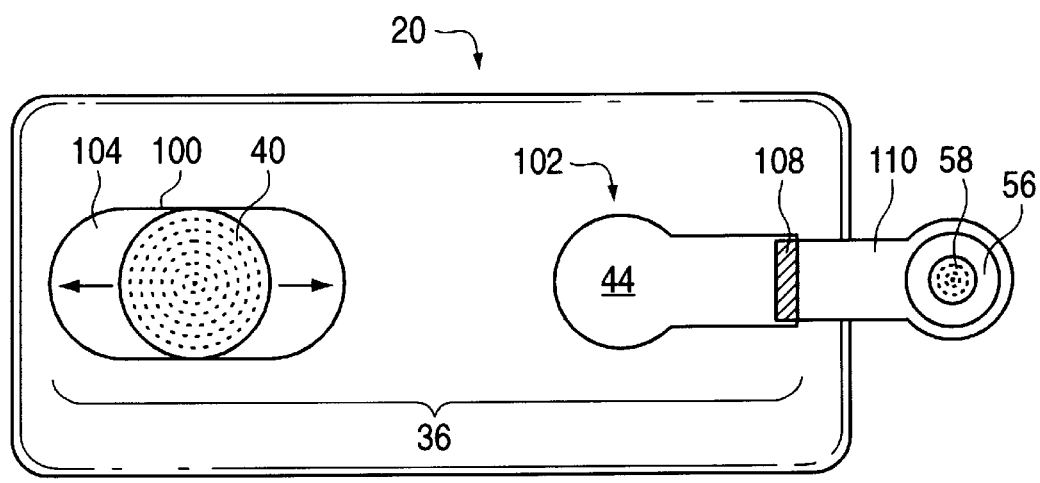
FIG. 7B is a diagram illustrating the second embodiment of the coupler in accordance with the invention in an open position.

FIGS. 7A and 7B are diagrams illustrating the communications device 20 incorporating a second embodiment of the coupler 36 in accordance with the invention. In particular, FIG. 7A shows the coupler 36 in a closed position while FIG. 7B shows the coupler 36 in an open position. In this embodiment, the coupler 36 may include a speaker mounting assembly 100 and a microphone mounting assembly 102. In accordance with this embodiment of the invention, the speaker 40 may be moved to adjust its position relative to the microphone assembly 102 so that the coupler may properly couple to a variety of different telephone handsets. The speaker assembly 100 may include the speaker 40 which moves (i.e., slides) within a recess/track 104 in the device to adjust the position of the speaker 40 relative to the microphone assembly 102.

The microphone assembly 102 may include the recess 44 into which a microphone assembly 106 sits when it is in the closed/retracted position as shown in FIG. 7A. The microphone assembly 106 may also have a spring-biased hinge member 108 which hinges a microphone support member 110 to the device 20. The hinge member 108 may keep the microphone assembly 106 in a closed position unless help open by a force which overcomes the bias force of the hinge member. When the microphone assembly 106 is in an open position, as shown in FIG. 7B, the microphone assembly is rotated about the hinge 108 until the microphone support member 110 is in an extended position. When the microphone assembly 102 is in the open position, the sealing cup 56 and the microphone 58 are exposed so that they may be coupled to the earpiece of the telephone handset. The hinge 108 may spring bias the microphone support member 110 away from the device 20 so that when the telephone handset is pressed against the device 20, the microphone support member may press the microphone and sealing cup against the handset to achieve a good acoustical coupling. Thus, in this embodiment, the speaker in the speaker assembly may be moved to adjust the coupler 36 for different telephone handsets, but the microphone assembly still presses the sealing cup against the earpiece. Now, a third embodiment of the coupler will be described.

Figure 8A:
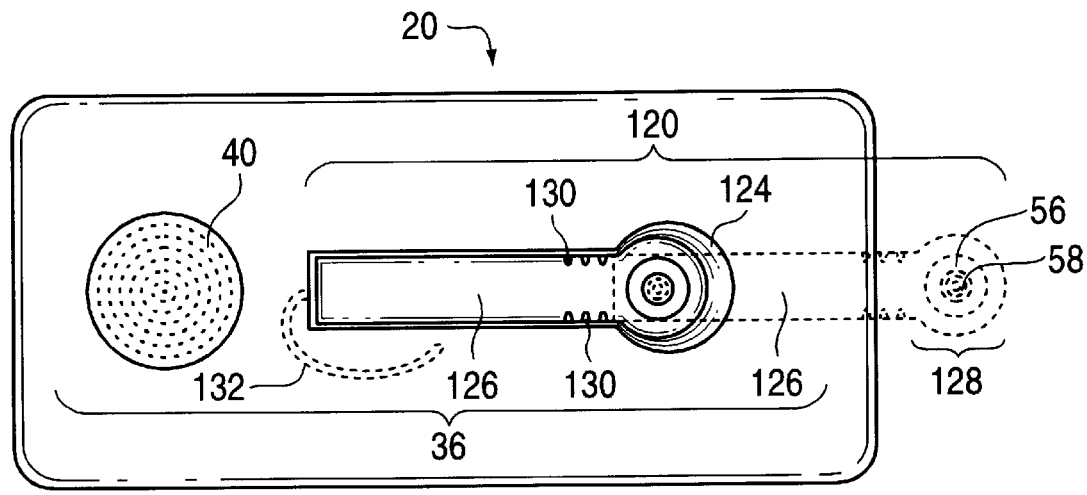
FIGS. 8A and 8B are a top view and side view, respectively, of a third embodiment of the coupler in accordance with the invention.
Figure 8B:
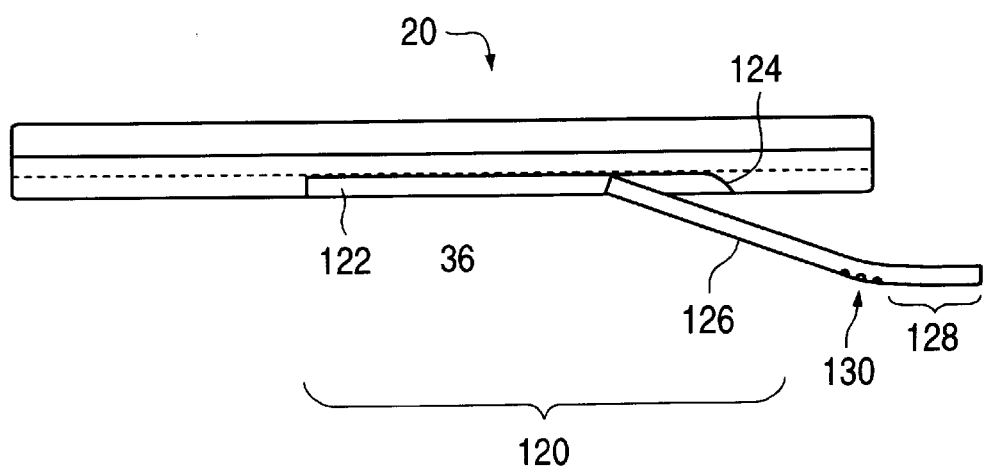

FIGS. 8A and 8B are a top view and side view, respectively, of a third embodiment of the coupler in accordance with the invention. In this embodiment, the speaker 40 is located at a fixed position on the device 20 while a microphone assembly 120 may permit the position of the sealing cup 56 and the microphone 58 to be adjusted relative to the speaker 40 to accommodate different types of telephone handsets. In this embodiment, the device 20 may include a recess 122 into which the microphone assembly 120 may retract and a microphone recess 124 in which the microphone and sealing cup may sit when the microphone assembly 120 is in a retracted position. The microphone recess 124 may have sloped slides which form a ramp so that the microphone and sealing cup slide out of the recess easily. In addition, the sloped sides may apply some force to the microphone assembly 120 as described below similar to the biasing member in the prior embodiments.

The microphone assembly 120 may further include a microphone support member 126 (shown in phantom in the extended position) which is attached to a microphone holder 128 which houses the sealing cup and microphone. The microphone support member 126 may slide in the recess 122 between an extended position and a retracted position and may include one or more indentations 130 near the attachment point of the microphone holder 128. In this embodiment, the microphone support member may be preflexed and stored in a flat position so that, as it is extended, it moves away from the device. The indentations keep the microphone support member from sliding back and forth and being pushed back into the device. To bias the microphone support member 126 away from the device 20, the lower portion of the microphone support member 126 may rest against the recess 124 in an extended position, as shown in FIG. 8B, and push the microphone away from the device. Then, when the telephone handset is moved into position over the device 20, the microphone support member 126 bends which further increases the force with which the microphone support member 126 presses the sealing cup against the telephone handset. To further increase the amount of force with which the microphone support member 126 is biased away from the device 20, a flexible member 132 may be attached to the microphone support member 126 so that as the microphone support member 126 is extended, the flexible member 132 further biases the microphone support member away from the device 20. Now, a fourth embodiment of the coupler in accordance with the invention will be described.

Figure 9A:
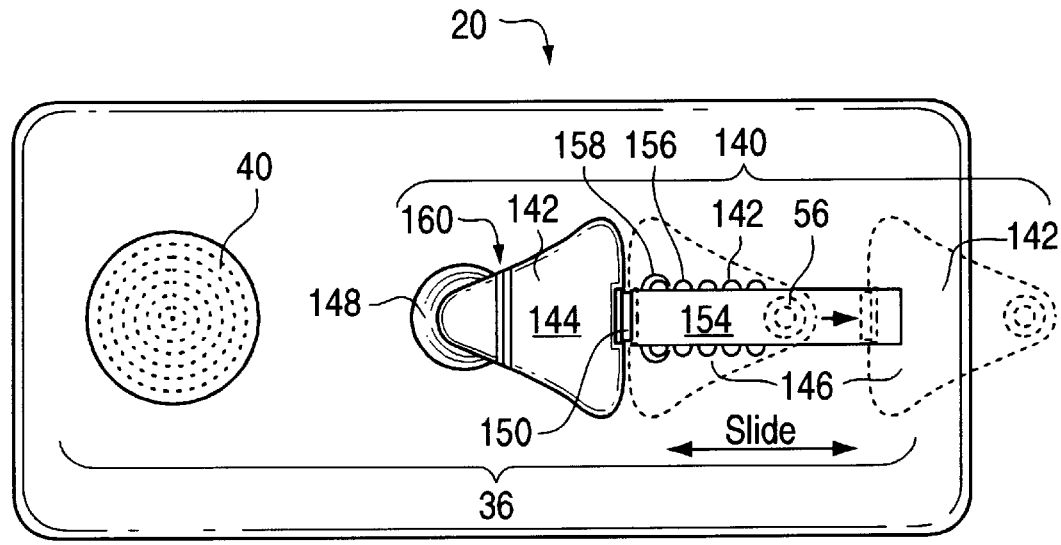
FIGS. 9A and 9B are a top view and a side view, respectively, of a fourth embodiment of the coupler in accordance with the invention.
Figure 9B:
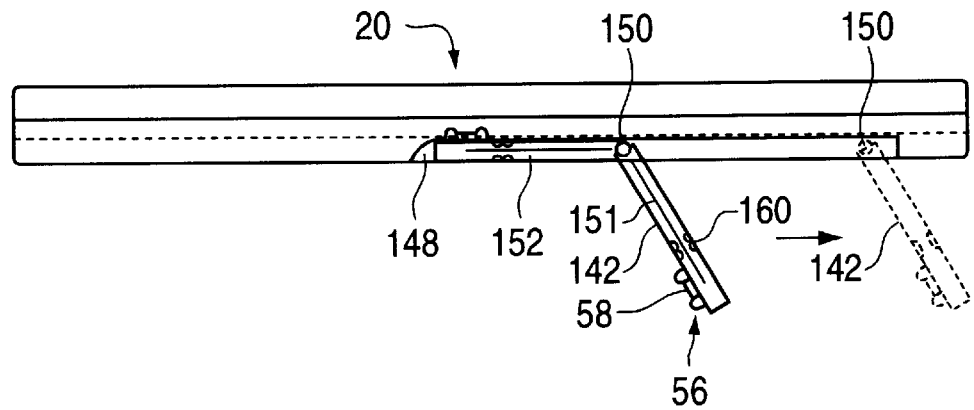

FIGS. 9A–9D show various views of the device 20 incorporating a fourth embodiment of the coupler 36 in accordance with the invention. As shown in FIGS. 9A and 9B, the coupler 36 may include a speaker 40 in a fixed position and a microphone assembly 140 which permits the microphone's position relative to the speaker to be adjusted. The microphone assembly 140 may include a microphone housing 142 having a back surface 144 and a front surface 146 onto which the microphone and sealing cup are attached. In a closed position, the back surface 144 of the microphone housing 142 may be exposed which protects the microphone from damage. When the microphone assembly is in an extended position, the front surface 146 of the microphone housing is exposed (as shown by the phantom outlines of the housing in FIG. 9A) which also exposes the sealing cup 56 and the microphone 58. Thus, while the microphone assembly 140 is closed, the microphone is protected. To permit the microphone assembly to be opened, the device 20 may include a slot 148 into which a user may place his finger in order to flip the microphone assembly from a closed position to an open position. The microphone housing 142 may be connected to the device 20 by a cam pivot 150 which permits the microphone housing to rotate between the closed position and the open position. The cam pivot may also be spring biased to bias the microphone housing away from the device when the microphone housing is opened.

To adjust the position of the microphone assembly 140 relative to the speaker 40, the microphone housing 142 is attached to a member 152 which slides in a channel 154 in the device 20. The channel 154 may have a plurality of projections 156 which interact with a lateral lock spring 158 attached to the microphone housing 142 to ratchet the microphone housing between the open position and the desired position relative to the speaker 40. Thus, the microphone housing 142 may slide in the channel 154 to provide adjustment of the position of the microphone 58 relative to the speaker 40.

To generate additional force to couple the sealing cup 56 to the telephone handset, the microphone housing 142 may include a biasing member 151, such as a spring, molded into the microphone housing 142 and one or more bend grooves 160. As a telephone is pressed against the microphone housing, the biasing member 151 and grooves 160 may bend and resist the bending which causes the sealing cup to be pressed against the earpiece of the telephone handset. Now, the details of the microphone housing will be described.

Figure 9C:
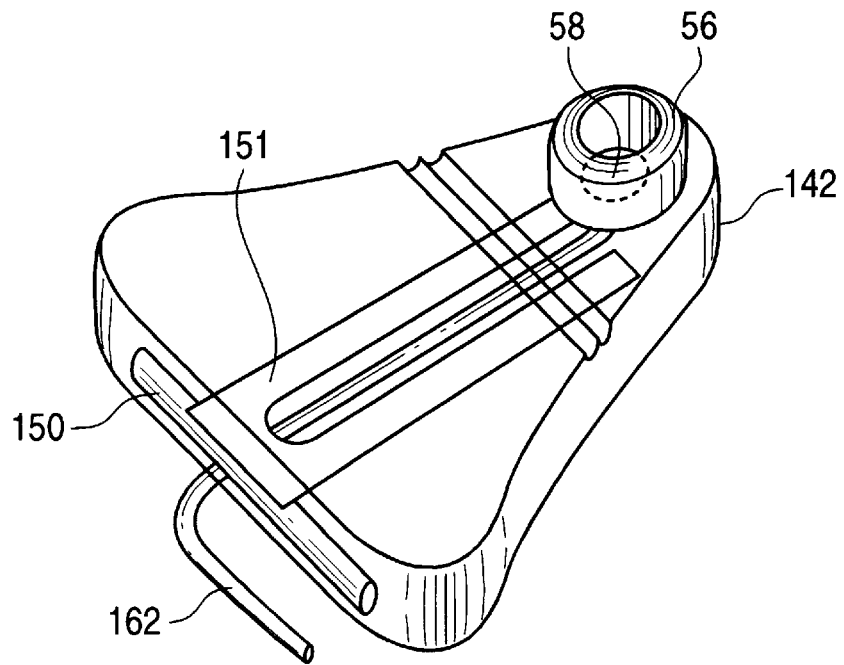
FIG. 9C is a diagram illustrating more details of the microphone portion of the fourth embodiment of the coupler shown in FIGS. 9A and 9B.
Figure 9D:
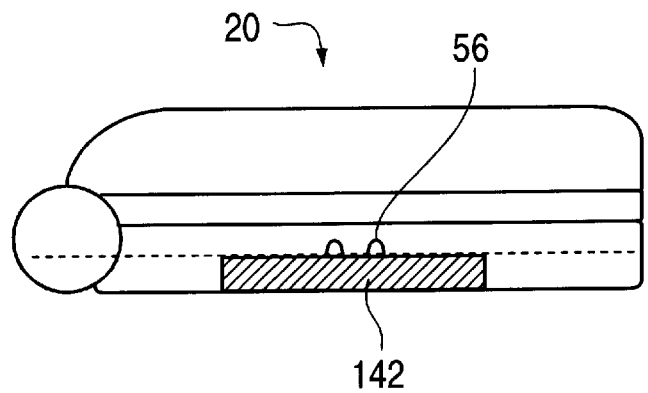
FIG. 9D is a cutaway side view of a portion of the fourth embodiment of the coupler in accordance with the invention.

FIG. 9C is a perspective view of the microphone housing 142 including the sealing cup 56 and the microphone 58. The microphone 58 may receive power and provide signals back to the device 20 via an electrical cable 162. The biasing member 151, which is molded into the microphone housing 142, may have a U-shape wherein the bottom portion of the U-shape may be attached to the pivot cam 150 and the arms of the U-shape may extend towards the microphone 58. The biasing member 151 may be made of stamped steel or any other material with sufficient spring strength to generate a biasing force as the telephone presses against the microphone housing. As shown in FIG. 9D, when the microphone assembly 142 is in the closed position, the various sensitive components, such as the sealing cup 56 shown and the microphone (not shown) are protected from damage. Now, a fifth embodiment of the coupler will be described.

Figure 10A:
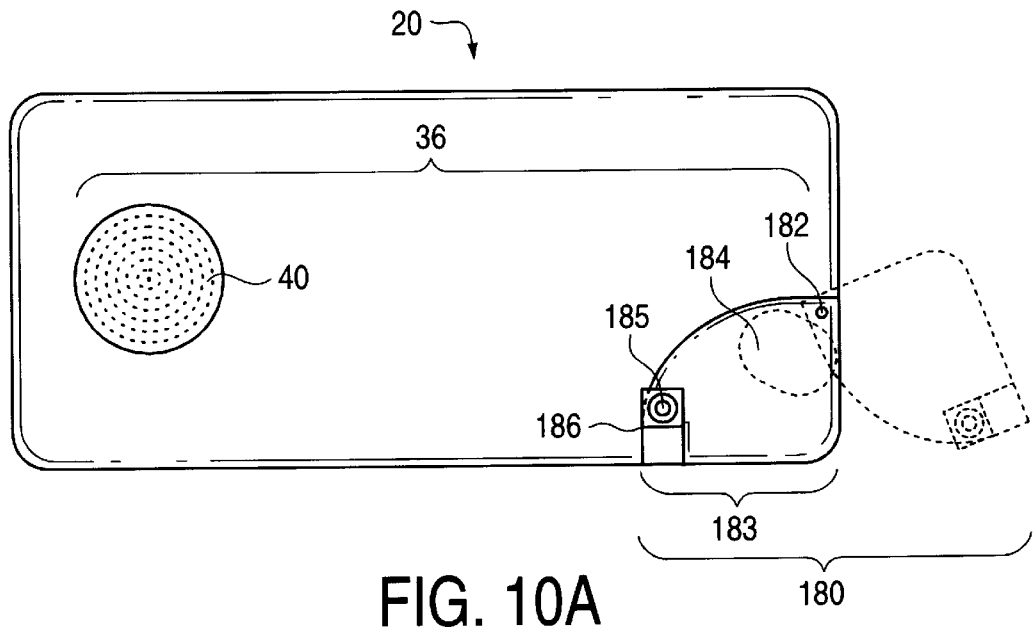
FIGS. 10A and 10B are a top view and a side view, respectively, of a fifth embodiment of the coupler in accordance with the invention.
Figure 10B:
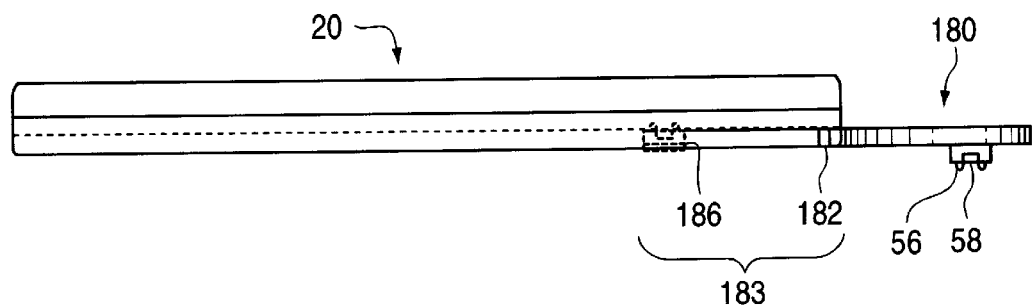
Figure 10C:
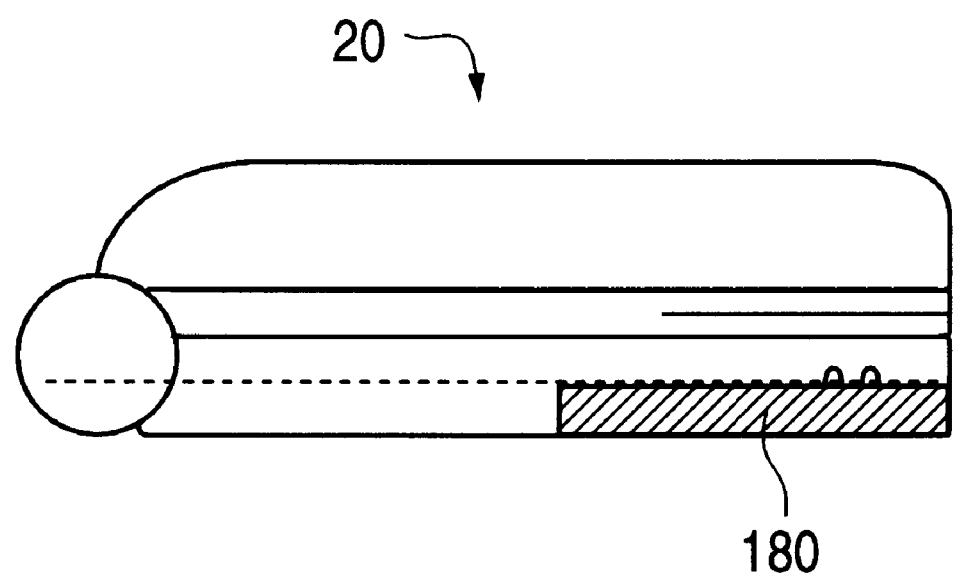
FIG. 10C is a side view of a portion of the fifth embodiment of the coupler in accordance with the invention.

FIGS. 10A–10C are diagrams illustrating the device 20 incorporating a fifth embodiment of the coupler 36 in accordance with the invention. In this embodiment, the speaker 40 is in a fixed position and a microphone assembly 180 is movable to adjust to different telephone handsets. In this embodiment, the microphone assembly 180 may rotate about a pivot point 182 out of a recess 183 in a corner of the device from a closed position to an open/extended position (shown in phantom in FIG. 10A). The microphone assembly 180 as shown may have an arcuate shape which matches the shape of the device 20 at that location. To maintain the microphone assembly in a locked position during transport, the recess of the device may include a friction mat 184. As shown in FIG. 10C, when the microphone assembly 180 is in the closed position, the sensitive components, such as the microphone or sealing cup, is protected from damage.

As shown in FIG. 10B, when the microphone assembly is in the closed position, the sensitive components, such as the sealing cup 56 and microphone 58, which are attached to a microphone mounting member 185, are positioned pointing upwards into the device 20. Then, due to a hinge 186 attached to the microphone mounting member 185, the microphone mounting member may rotate so that, as the microphone assembly 180 is rotated outwards, the sealing cup 56 and microphone 58 are rotated in a direction away from the device so that they are ready to be coupled to the telephone handset. Now, a sixth embodiment of the coupler will be described.

Figure 11A:
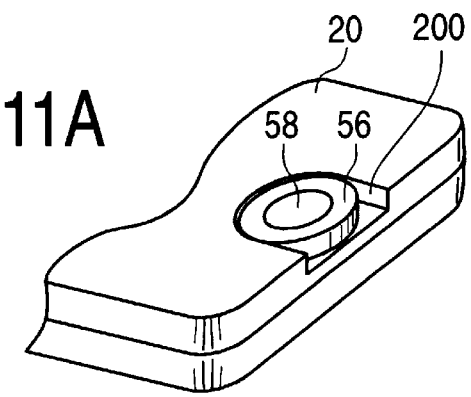
FIGS. 11A–11C illustrate a sixth embodiment of the coupler in accordance with the invention.
Figure 11B:
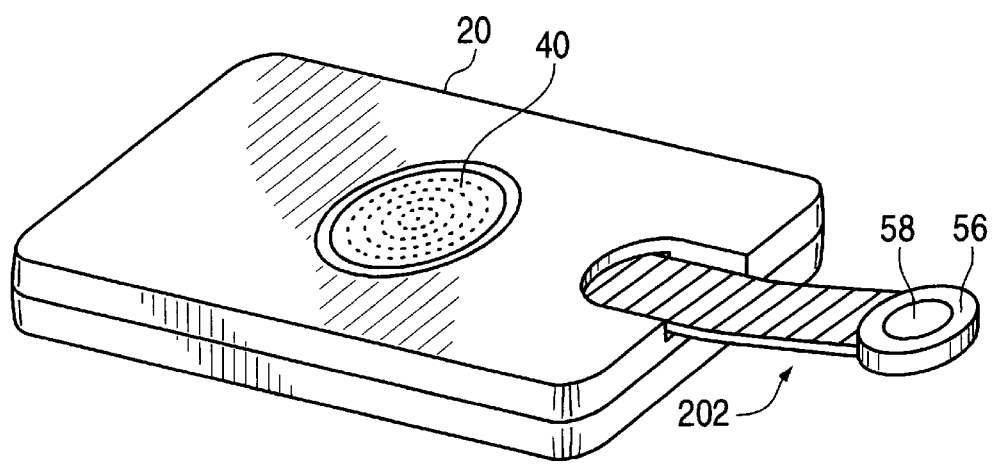
Figure 11C:
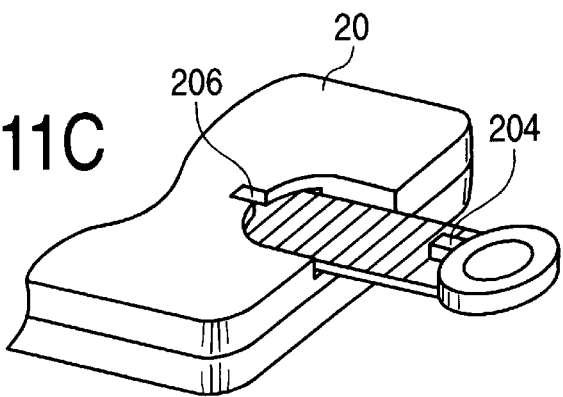

FIGS. 11A–11C illustrate a sixth embodiment of the coupler in accordance with the invention in which the microphone's position is changed. FIG. 11A shows this embodiment of the coupler in the retracted position while FIGS. 11B and 11C show the embodiment in the extended position. As shown, the device 20 includes a speaker 40, which does not require an acoustical seal, and a microphone 58 which is surrounded by the seal 56. In the retracted position, the microphone 58 and seal 56 are located in a microphone cavity 200 located in the side of the case of the device. To extend the microphone 58, the user may pull the microphone out of the cavity and extend a microphone arm 202 as shown in FIG. 11B. The microphone arm 202 in this embodiment may be a flexible metal spring which biases the microphone arm 202 away from the device, as described above, coated with a plastic material. The microphone arm may be extended to a plurality of different predetermined positions to accommodate a variety of different telephone handsets. As shown in FIG. 11C, to help a user to extend the microphone arm 202, the microphone arm 202 and in particular the upper part of the microphone arm near the microphone may include a tab 204 which the user may use to extend the microphone arm. When the microphone arm is in the retracted position, the tab 204 may fit into a recess 206 in the device 20. This embodiment of the coupler device may be used, for example, with a device, such as the Palm III manufactured by 3COM, which has a small size and small case that is not long enough to accommodate both the speaker and the microphone. Now, a seventh embodiment of the invention will be described.

Figure 12:
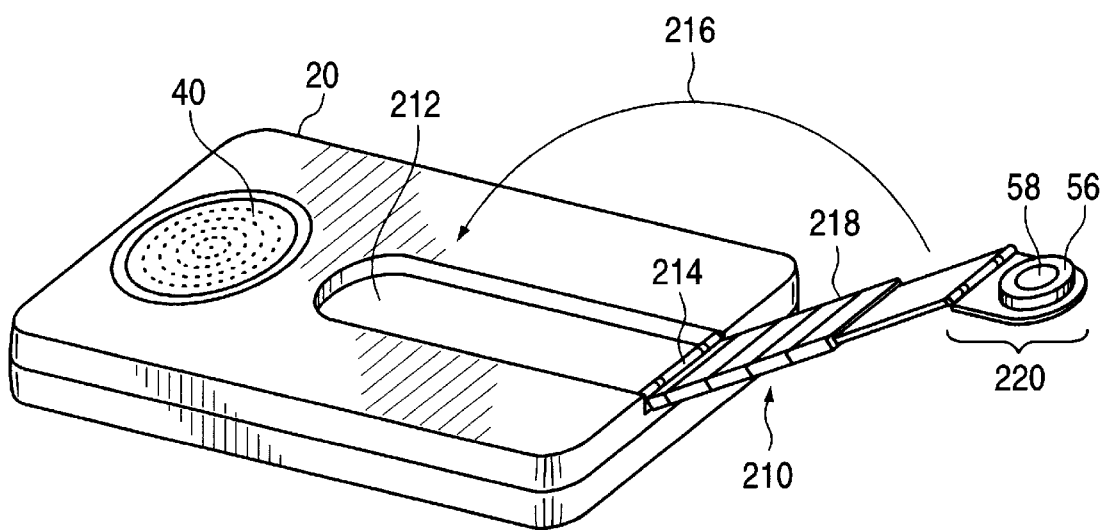
FIG. 12 illustrates a seventh embodiment of the coupler in accordance with the invention.

FIG. 12 illustrates a seventh embodiment of the coupler in accordance with the invention. This embodiment of the invention may also be used with a device 20 having a short length. As shown, the device may include the speaker 40 and a microphone assembly 210 which includes the seal 56 and the microphone 58. The microphone assembly 210 may be folded into a cavity 212 in the device 20 when not in use. The microphone assembly may rotate about a pivot point 214 to flip out into an extended position and flip back into the retracted position as shown by an arrow 216. The microphone assembly may be spring-biased out away from the device 20 as with the other embodiments. The microphone assembly 210 may include a microphone arm 218 and a microphone support assembly 220 attached to the end of the microphone arm 218. The microphone support assembly may include the seal 56 and the microphone 58. Now, an eighth embodiment of the coupler will be described.

Figure 13A:
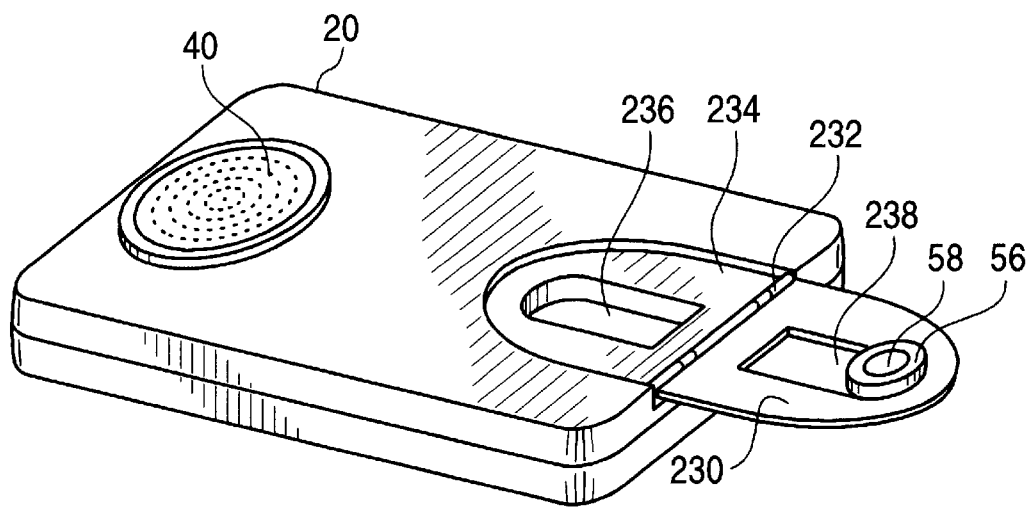
FIGS. 13A–13B illustrate an eighth embodiment of the coupler in accordance with the invention.
Figure 13B:
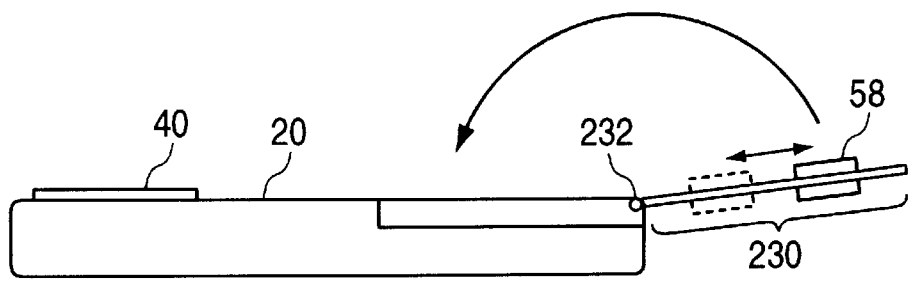

FIGS. 13A–13B illustrate an eighth embodiment of the coupler in accordance with the invention. As shown, the device 20 may include the speaker 40, the seal 56 and the microphone 58. The device 20 may also include a flip assembly 230 which may be semi-circular shaped and may be connected to the device 20 by a hinge mechanism 232. The flip assembly and the seal and microphone may rest in a recess 234 in the device which may also include a deeper recess 236 into which the microphone may be located when the coupler device is in the retracted position so that the microphone and seal are protected. Once the flip assembly is rotated about the hinge and opened into an extended position, the microphone and seal are exposed for coupling to a telephone handset. To adjust the position of the microphone relative to the speaker, the microphone 58 may move within a channel 238 in the flip portion as shown in FIG. 13B. Now, a ninth embodiment of the coupler will be described.

Figure 14:
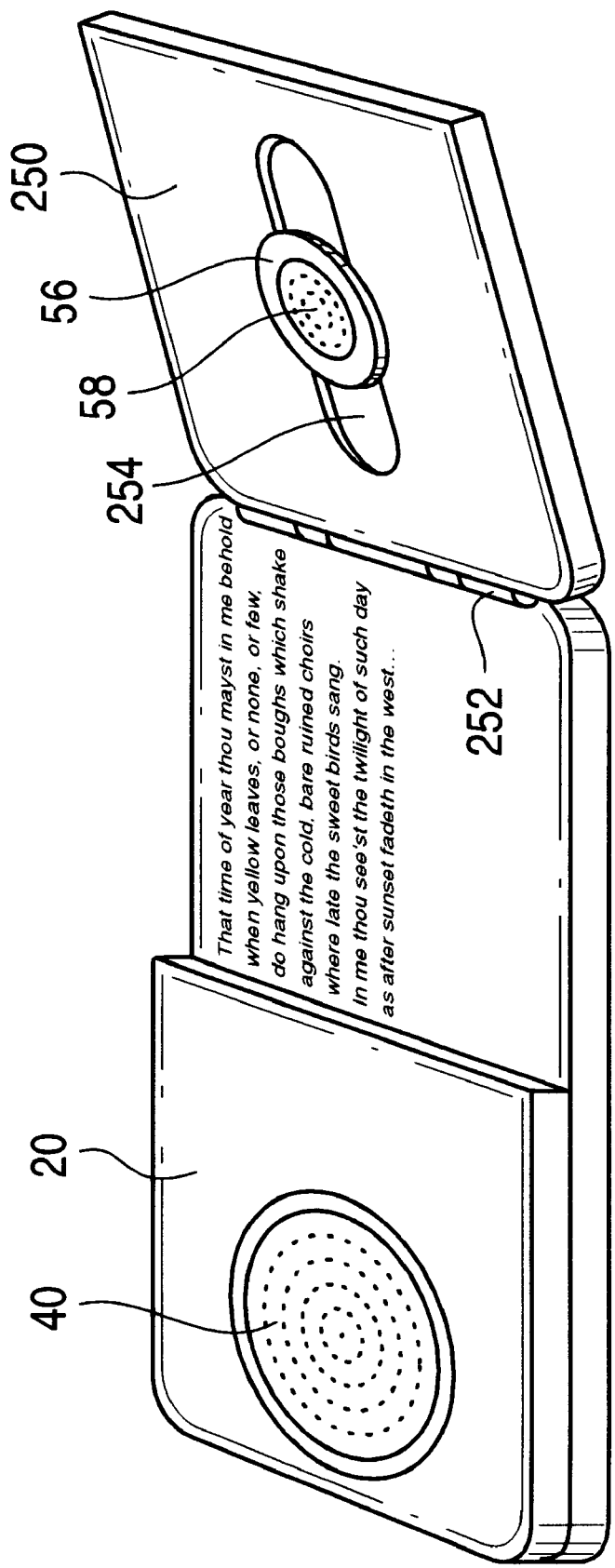
FIG. 14 illustrates a ninth embodiment of the coupler in accordance with the invention.

FIG. 14 illustrates a ninth embodiment of the coupler in accordance with the invention in which the device 20 may include a fixed position speaker 40 and a rectangular flip portion 250 which rotates about a hinge 252 between a retracted, closed position and an extended, open position. When the flip portion 250 is closed, the seal 56 and microphone 58 are protected from damage. When the flip portion is opened, the seal and microphone are exposed to permit coupling to the telephone handset. In this embodiment, the microphone 58 may be slideably mounted in a channel 254 in the flip portion so that the position of the microphone 58 relative to the speaker 40 may be changed. Now, a tenth embodiment of the coupler will be described.

Figure 15:
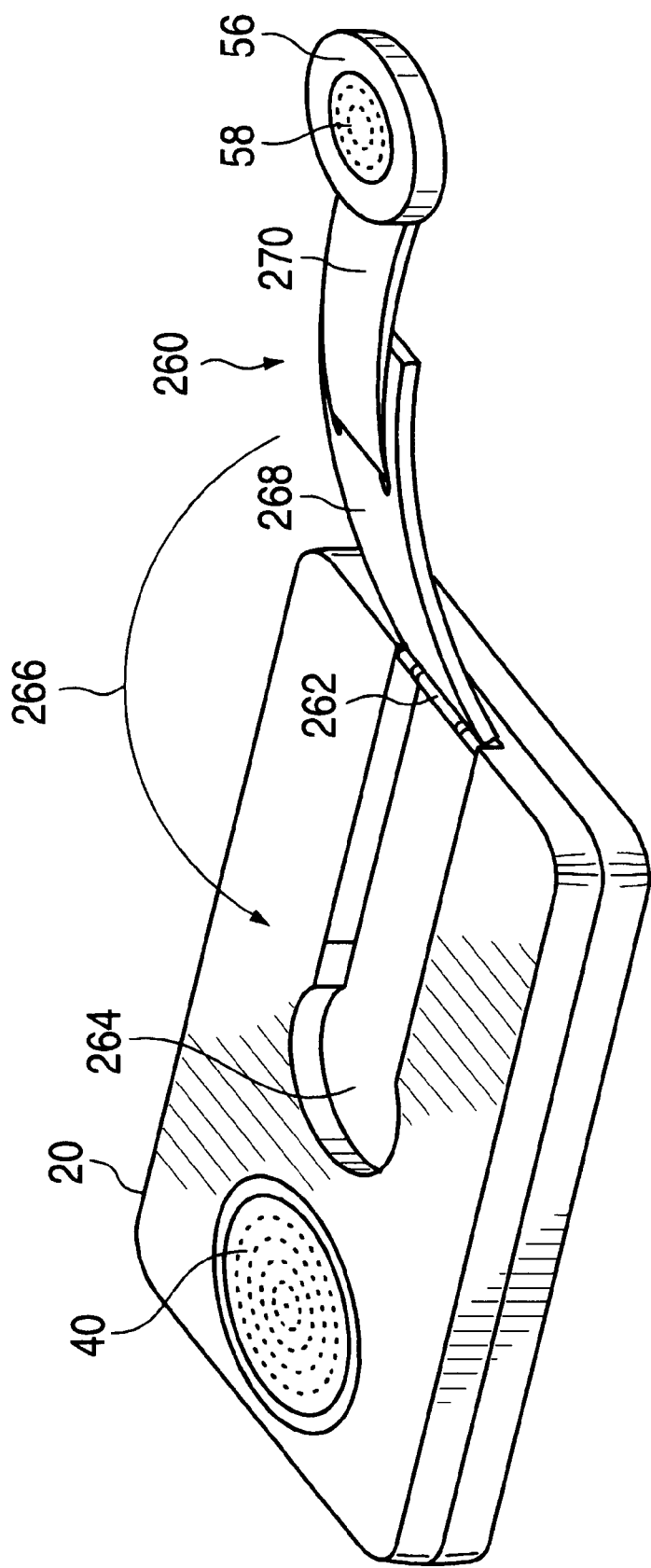
FIG. 15 illustrates a tenth embodiment of the coupler in accordance with the invention.

FIG. 15 illustrates a tenth embodiment of the coupler in accordance with the invention in which the device 10 may include a fixed position speaker 40 and a microphone assembly 260 which is attached to the device 20 by a spring-biased hinge 262. The microphone assembly 260 may rotate between a closed, retracted position within a cavity 264 in the device case and a open, extended position as shown by an arrow 266. To adjust the position of the microphone relative to the speaker, the microphone assembly may include a fixed arm portion 268 and a second arm portion 270 which are slideable connected together so that the position of the microphone 58 at the end of the second arm portion may be adjusted. Now, an eleventh embodiment of the coupler will be described.

Figure 16A:
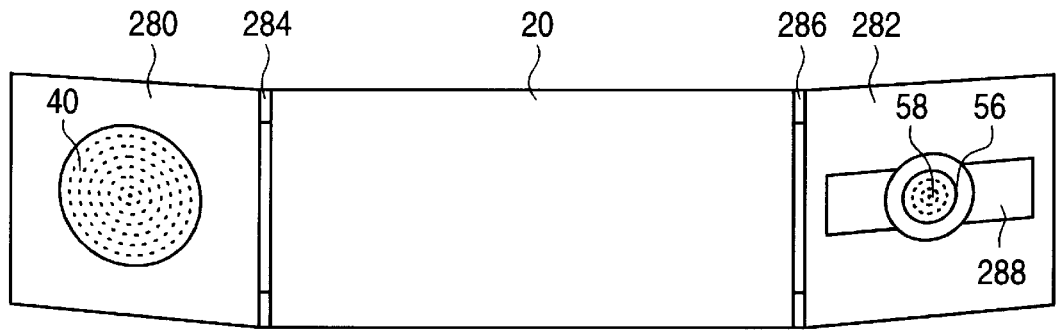
FIGS. 16A and 16B illustrate an eleventh embodiment of the coupler in accordance with the invention.
Figure 16B:
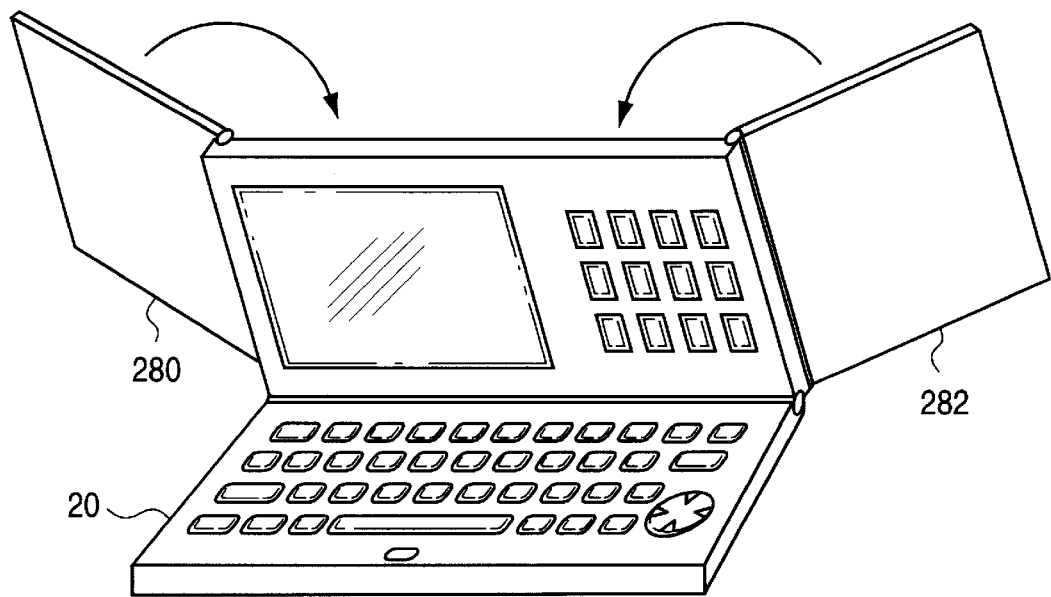

FIGS. 16A and 16B illustrates an eleventh embodiment of the coupler in accordance with the invention in which the device 20 may include a first flip portion 280 and a second flip portion 282 which rotate about hinges 284, 286. In particular, when the flip portions are closed, the microphone 58 and speaker 40 are not exposed and the flip portions form the case of the device. As the flip portions are rotated about the hinges 284, 286, the speaker 40 and the microphone 58 are exposed so that a telephone handset may be coupled to the device 20. In this embodiment, the microphone 58 may be mounted in a channel 288 in the device 20 so that the position of the microphone relative to the speaker may be adjusted.

While the foregoing has been with reference to particular embodiments of the invention, it will be appreciated by those skilled in the art that changes in this embodiment may be made without departing from the principles and spirit of the invention as set forth in the appended claims.

What is claimed is:

1. A device for acoustically coupling a communication device having a microphone and a speaker, the microphone and speaker being coupled to an earpiece and mouthpiece, respectively, of a telephone handset, the device comprising:

a speaker assembly attached to a housing of the communications device;

a microphone assembly attached to the housing, the microphone assembly comprising the microphone, a seal surrounding the microphone and means for biasing the microphone and seal to sealingly engage the earpiece of the telephone handset to establish an acoustical coupling between the microphone and the earpiece;

means for adjusting the position of the microphone assembly relative to the speaker assembly to vary the distance between the microphone and speaker to accommodate a variety of different telephone handsets, the adjusting means comprising a microphone arm which supports the microphone, the microphone arm sliding within a channel in the housing to move from a retracted position to an extended position, the sliding of the microphone arm adjusting the position of the microphone relative to the speaker; and the biasing means comprising a spring attached to the microphone arm which bias the microphone arm away from the housing when the microphone arm in the extended position so that the seal is pressed against the earpiece of the telephone handset.

2. The device of claim 1, wherein the adjusting means comprises means for moving the position of the speaker assembly relative to the microphone assembly to adjust the position of the microphone relative to the speaker.

3. The device of claim 1, wherein said speaker is pressed directly against the mouthpiece of the telephone handset without an acoustical seal.

4. The device of claim 1, wherein the microphone assembly comprises a microphone arm within a cavity in the housing that extends away from the side of the housing as the microphone arm is extended.

5. The device of claim 1 further comprising a pad located adjacent the speaker assembly on the housing of the device which prevents the mouthpiece of the telephone handset from slipping off of the device.

6. The device of claim 1, wherein the microphone assembly further comprises a recess in the housing of the device into which the microphone and seal are stored when the microphone arm is in the retracted position.

7. The device of claim 1, wherein the microphone arm further comprises a base portion which slides within the channel of the housing and the microphone arm is rotatably attached to the base portion and biased away from the device by the seal biasing means.

8. The device of claim 7, wherein the microphone assembly further comprises a microphone carrier including the microphone and seal and a rigid connector between the microphone arm and the microphone carrier to transfer the bias force exerted on the microphone arm to the seal.

9. A device for acoustically coupling a communication device having a microphone and a speaker, the microphone and speaker being coupled to an earpiece and mouthpiece, respectively, of a telephone handset, the device comprising:
a speaker assembly attached to a housing of the communications device;
a microphone assembly attached to the housing, the microphone assembly comprising the microphone, a seal surrounding the microphone, means for biasing the microphone and seal to sealingly engage the earpiece of the telephone handset to establish an acoustical coupling between the microphone and the earpiece, a flip assembly rotatably connected to the housing of the device so that the microphone is protected when the flip assembly is in a closed position, the flip assembly further comprises a channel in which the microphone is mounted so that the position of the microphone is adjusted; and
means for adjusting the position of the microphone assembly relative to the speaker assembly to vary the distance between the microphone and speaker to accommodate a variety of different telephone handsets.

10. The device of claim 9, wherein the flip assembly has a semi-circular shape.

11. The device of claim 9, wherein the flip assembly has a rectangular shape.

12. The device of claim 9, wherein the speaker assembly comprises a flip assembly so that both the speaker and microphone are protected when the flip assemblies are in the closed position.

13. A device for acoustically coupling a communication device having a microphone and a speaker, the microphone and speaker being coupled to an earpiece and mouthpiece, respectively, of a telephone handset, the device comprising:
a speaker assembly attached to a housing of the communications device;
a microphone assembly attached to the housing, the microphone assembly comprising the microphone, a seal surrounding the microphone, means for biasing the microphone and seal to sealingly engage the earpiece of the telephone handset to establish an acoustical coupling between the microphone and the earpiece, a microphone recess in the housing, a microphone carrier rotatably attached to the housing that moves from a closed position in the microphone recess to an open position, wherein the microphone is exposed only when the microphone carrier is in the open position, the microphone carrier, when in the open position, sliding in a channel in the housing to adjust the position of the microphone relative to the speaker; and
means for adjusting the position of the microphone assembly relative to the speaker assembly to vary the distance between the microphone and speaker to accommodate a variety of different telephone handsets.

14. The device of claim 13, wherein the biasing means further comprises a spring member integrally formed within the microphone carrier.

15. The device of claim 14, wherein the microphone assembly further comprises the channel in the housing having a plurality of extending portions and the microphone carrier comprises a leaf spring which interacts with the extending portions to fix the microphone carrier in one or more predetermined positions.

16. The device of claim 15, wherein the microphone carrier further comprises one or more bend portions near the microphone which bends as the telephone handset is pressed against the seal and biases the seal towards the telephone handset.

17. A device for acoustically coupling a communication device having a microphone and a speaker, the microphone and speaker being coupled to an earpiece and mouthpiece, respectively, of a telephone handset, the device comprising:
a speaker assembly attached to a housing of the communications device;
a microphone assembly attached to the housing, the microphone assembly comprising the microphone, a seal surrounding the microphone, means for biasing the microphone and seal to sealingly engage the earpiece of the telephone handset to establish an acoustical coupling between the microphone and the earpiece, a microphone carrier pivotably connected to the device, the microphone carrier forming a portion of the housing in a closed position and rotating to expose the microphone in the open position and a hinge connected to the microphone carrier for rotating the microphone and seal from a first position facing towards the device when the microphone carrier is in the closed position to a second position facing away from the device when the microphone carrier is in the open position; and
means for adjusting the position of the microphone assembly relative to the speaker assembly to vary the distance between the microphone and speaker to accommodate a variety of different telephone handsets.

18. The device of claim 17, wherein the microphone assembly further comprises a mat of frictional material attached to the housing.

19. A device for acoustically coupling a communication device having a microphone and a speaker, the microphone and speaker being coupled to an earpiece and mouthpiece, respectively, of a telephone handset, the device comprising:
a speaker assembly attached to a housing of the communications device;
a microphone assembly attached to the housing, the microphone assembly comprising the microphone, a seal surrounding the microphone, means for biasing the microphone and seal to sealingly engage the earpiece of the telephone handset to establish an acoustical coupling between the microphone and the earpiece, a microphone recess in the housing, a microphone carrier rotatably attached to the housing that moves from a closed position in the microphone recess to an open position, wherein the microphone is exposed only when the microphone carrier is in the open position, and wherein the biasing means comprises a spring that biases the microphone carrier away from the housing when the microphone carrier is in the open position; and means for adjusting the position of the speaker assembly relative to the microphone assembly to vary the distance between the microphone and speaker to accommodate a variety of different telephone handsets, the adjusting means further comprising a speaker that slides within a channel in the housing to adjust the position of the speaker relative to the microphone.

20. A device for acoustically coupling a communication device having a microphone and a speaker, the microphone and speaker being coupled to an earpiece and mouthpiece, respectively, of a telephone handset, the device comprising:

a speaker assembly attached to a housing of the communications device;

a microphone assembly attached to the housing, the microphone assembly comprising the microphone, a seal surrounding the microphone, means for biasing the microphone and seal to sealingly engage the earpiece of the telephone handset to establish an acoustical coupling between the microphone and the earpiece, a channel in the housing, a microphone arm with the microphone attached to the end of the arm opposite the end attached to the housing, the microphone arm sliding in the channel in the housing from a retracted position to an extended position to change the position of the microphone relative to the speaker, and a plurality of bend points near the microphone which bends as the telephone handset is pressed against the seal and biases the seal towards the telephone handset; and means for adjusting the position of the microphone assembly relative to the speaker assembly to vary the distance between the microphone and speaker to accommodate a variety of different telephone handsets.

21. A device for acoustically coupling a communication device having a microphone and a speaker, the microphone and speaker being coupled to an earpiece and mouthpiece, respectively, of a telephone handset, the device comprising:

a speaker assembly attached to a housing of the communications device;

a microphone assembly attached to the housing, the microphone assembly comprising the microphone, a seal surrounding the microphone, means for biasing the microphone and seal to sealingly engage the earpiece of the telephone handset to establish an acoustical coupling between the microphone and the earpiece, a microphone arm rotatably connected to the housing of the device and a second microphone arm slideable connected to the microphone arm to adjust the position of the microphone; and means for adjusting the position of the microphone assembly relative to the speaker assembly to vary the distance between the microphone and speaker to accommodate a variety of different telephone handsets.

* * * * *